United States Patent
Joshi et al.

(10) Patent No.: US 6,650,782 B1
(45) Date of Patent: Nov. 18, 2003

(54) VISUALLY PROGRESSIVE ORDERING OF COMPRESSED SUBBAND BIT-PLANES AND RATE-CONTROL BASED ON THIS ORDERING

(75) Inventors: Rajan L. Joshi, Rochester, NY (US); Paul W. Jones, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/512,731

(22) Filed: Feb. 24, 2000

(51) Int. Cl.[7] .................................................. G06K 9/36
(52) U.S. Cl. ........................ 382/239; 382/232; 382/248
(58) Field of Search ................................. 382/232, 248, 382/239, 251, 280, 302; 375/240.1; 348/438, 408, 437

(56) References Cited

U.S. PATENT DOCUMENTS 5,867,602 A * 2/1999 Zandi et al. ................. 382/248
6,327,392 B1 * 12/2001 Li ............................... 382/248

OTHER PUBLICATIONS

Hwang et al., "Storage and Entropy–Constrained Multi–Stage Vector Quantization", IEEE Global Telecommunications Conference, vol. 1, Nov. 1995, pps. 457–461.*

"Comparative study of wavelet and DCT decompositions with equivalent quantization and encoding strategies for medical images" by Paul W. Jones, Scott Daly, Roger S. Gaborski, and Majid Rabbani. Proc. SPIE Medical Imaging '95, vol. 2431, pp. 571–582.

"Visual Progressive Coding" by Jin Li. SPIE Visual Communication and Image Processing, vol. 3653, No. 116, San Jose, California, Jan. 1999.

"Wavelet Transforms that Map Integers to Integers" by A.R. Calderbank, Ingrid Daubechies, Wim Sweldens, and Boon–Lock Yeo. Applied and Computational Harmonic Analysis, vol. 5, No. 3, pp. 332–369, 1998.

* cited by examiner

Primary Examiner—Anh Hong Do
(74) Attorney, Agent, or Firm—David M. Woods

(57) ABSTRACT

A method for encoding a digital image in a visually progressive manner comprises decomposing the digital image into two or more subbands; quantizing the subbands of the decomposed digital image to create quantized output values for each subband wherein each subband is quantized with a specific quantizer step size and forming bit-planes from the quantized output values of each subband and calculating an effective quantizer step size for each bit plane. Then a threshold viewing distance is computed for each bit-plane from the effective quantizer step size associated with that bit plane. The method further includes ordering the bit-planes in decreasing order to the corresponding threshold viewing distances; entropy coding the ordered bit-planes to produce a compressed bit-stream; and combining the compressed bit-stream with bit-plane ordering information to produce an encoded representation of the digital image.

30 Claims, 3 Drawing Sheets

VISUALLY PROGRESSIVE ORDERING OF COMPRESSED SUBBAND BIT-PLANES AND RATE-CONTROL BASED ON THIS ORDERING

FIELD OF INVENTION

The invention relates to a method of ordering the compressed bit-planes of a subband or wavelet image coder in the decreasing order of visual significance, also referred to as visually progressive ordering. The method also provides for rate-control of one or more images that have been encoded in the visually progressive manner. The rate-control method truncates the compressed bit streams for individual images so that the total file size of the truncated bit-streams does not exceed a user-specified bit-budget and the overall visual quality of the image set is maximized.

BACKGROUND OF THE INVENTION

In recent years, many methods for subband or wavelet coding of images have been proposed. Some of these methods use entropy coding of the subband coefficient bit-planes, where the subband coefficients may have been quantized. Importantly, bit-plane encoding of wavelet coefficients is being used in the emerging JPEG2000 image compression standard, as described in ISO/IEC JTC1/SC29 WG1 N1523, JPEG2000 Part I, Committee Draft, Version 1.0. A desirable feature of the subband bit-plane coders is that the order in which the compressed bit-planes appear in the output bit-stream is very flexible. For a practical and efficient compression system, the ordering has to satisfy only two conditions, namely: 1) for any subband, a bit-plane having higher significance should appear in the bit-stream before a bit-plane having a lower significance; and 2) the contexts used by the entropy coder must be dependent only on bit-planes that have appeared earlier in the bit-stream. Here, significance of a bit-plane refers to the position of the bit-plane in the binary representation of the quantized subband coefficient. In most binary representations, the left most bit-plane is the most significant and the right most bit-plane is the least significant.

These conditions will be referred to as the bit-plane ordering conditions. The ordering of the compressed bit-planes refers to the placement of bit-planes from all the subbands in the compressed bit-stream. It should be noted that compressed bit-planes from different subbands may be interspersed in the bit-stream. A useful feature of any coder that satisfies the bit-plane ordering conditions is that the compressed bit-stream is embedded. This means that if the compressed bit-stream is truncated at any arbitrary point, the truncated bit-stream can be decoded to produce a reconstructed image of lower quality than that produced by the full bit-stream. If the compressed bit-planes are ordered in the decreasing order of visual significance, then the bit-stream is said to be visually embedded or visually progressive.

In the prior art, visually progressive ordering is determined based on the relative visual weighting of the subbands (J. Li, "Visual Progressive Coding", SPIE Visual Communication and Image Processing, Vol. 3653, No. 116, San Jose, Calif., January 1999). In this method, it is possible to use different sets of visual weights at different ranges of bit-rates. The chief drawback of the method is that it is difficult to determine the bit-rate at which visual weights should be changed. This is because the compression ratios can vary widely depending on the image content, for the same compression settings.

A central aspect of this invention is to provide a method for ordering the compressed bit-planes in the decreasing order of visual significance. In the preferred embodiment, the visual significance of a bit-plane is quantified in terms of a threshold viewing distance, although other quality metrics indicative of a visual significance value could be used. A lower threshold viewing distance corresponds to lower visual significance. This eliminates the need for using multiple sets of visual weights and the problem of determining the rates at which the switching from one set of visual weights to another should occur. Furthermore, the invention provides an efficient method for rate-control of one or more images based on visually progressive ordering.

SUMMARY OF THE INVENTION

The invention relates to a method of ordering the compressed coefficient bit-planes of a subband or wavelet image coder in the decreasing order of their visual significance. The method also provides a means for a simple and computationally inexpensive method of determining truncation points for the compressed bit-streams corresponding to one or more images, so that the total file size of the truncated bit-streams does not exceed a user-specified bit-budget and the overall visual quality of the image set is maximized. One embodiment of the invention is a method for encoding a digital image comprising the steps of:

a) inputting the digital image;
b) decomposing the digital image into two or more subbands;
c) quantizing the subbands of the decomposed digital image to create quantized output values for each subband;
d) forming bit-planes from the quantized output values of each subband;
e) computing a visual significance value for each bit-plane;
f) ordering the bit-planes in decreasing order of the corresponding visual significance value;
g) entropy coding the ordered bit-planes to produce a compressed bit-stream; and
h) combining the compressed bit-stream with bit-plane ordering information to produce an encoded representation of the digital image.

While this embodiment describes only the encoder, it will be clear to those skilled in the art that the decoder will need to access the information regarding the bit-plane ordering before it can successfully reconstruct the image from the compressed bit-stream.

Another embodiment of this invention is a method for rate-control of one or more images comprising the steps of:

a) encoding the images in a visually progressive manner to form a compressed bit-stream for each image;
b) generating a table of visual significance values and corresponding file sizes for possible truncation points of the compressed bit-stream for each image;
c) initializing a current truncation point for each image;
d) truncating the compressed bit-stream for each image to the corresponding current truncation point;
e) calculating a total compressed file size for the truncated compressed bit-streams;
f) comparing the total compressed file size with a predetermined bit-budget;
g) updating the current truncation point to the next possible truncation point for the image having the lowest visual significance value at the next possible truncation point; and
h) repeating steps d through g until the total compressed file size is less than or equal to the bit-budget.

It is then an object of the invention to produce a compressed bit-stream for a digital image in which the bit-planes are ordered in the decreasing order of visual significance, that is, in the visually progressive manner.

It is a further object of the present invention to provide a simple and computationally inexpensive method for determining truncation points for the compressed bit-streams corresponding to individual images, so that the overall memory required is equal to or less than the bit-budget.

It is a further object of the present invention to provide a method of maximizing the visual quality of the reconstructed image for a given compressed file size when using a subband or wavelet decomposition.

Another object of the present invention is to provide a method of rate-control for one or more images that have been encoded in the visually progressive manner so that the overall memory required does not exceed the storage space available and the overall visual quality of the image set is maximized.

Other features and advantages of the present invention will be apparent from the following description in which the preferred embodiments have been set forth in conjunction with the accompanying drawings.

BRIEF DESCRIPTION OF THE DRAWINGS

In describing the preferred embodiments of the invention reference will be made to the series of figures and drawings briefly described below.

There may be additional structures described in the foregoing application that are not depicted on one of the described drawings. In the event such a structure is described, but not depicted in a drawing, the absence of such a drawing should not be considered as an omission of such design from the specification.

DETAILED DESCRIPTION OF THE INVENTION

Because subband and wavelet coding of images is well known, the present description will be directed in particular to attributes forming part of, or cooperating more directly with, the algorithm in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the system and methodology as described in the following materials, all such software implementation needed for practice of the invention is conventional and within the ordinary skill in such arts. If the invention is implemented as a computer program, the program may be stored in conventional computer readable storage medium, which may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Reference will now be made in detail to the present preferred embodiment of the invention, an example of which is illustrated in the accompanying drawings. While the invention will be described in connection with a preferred embodiment, it will be understood that it is not intended to limit the invention to that embodiment. On the contrary, it is intended to cover all alternatives, modifications, and equivalents as may be included within the spirit and scope of the invention defined in the appended claims.

Figure 1:
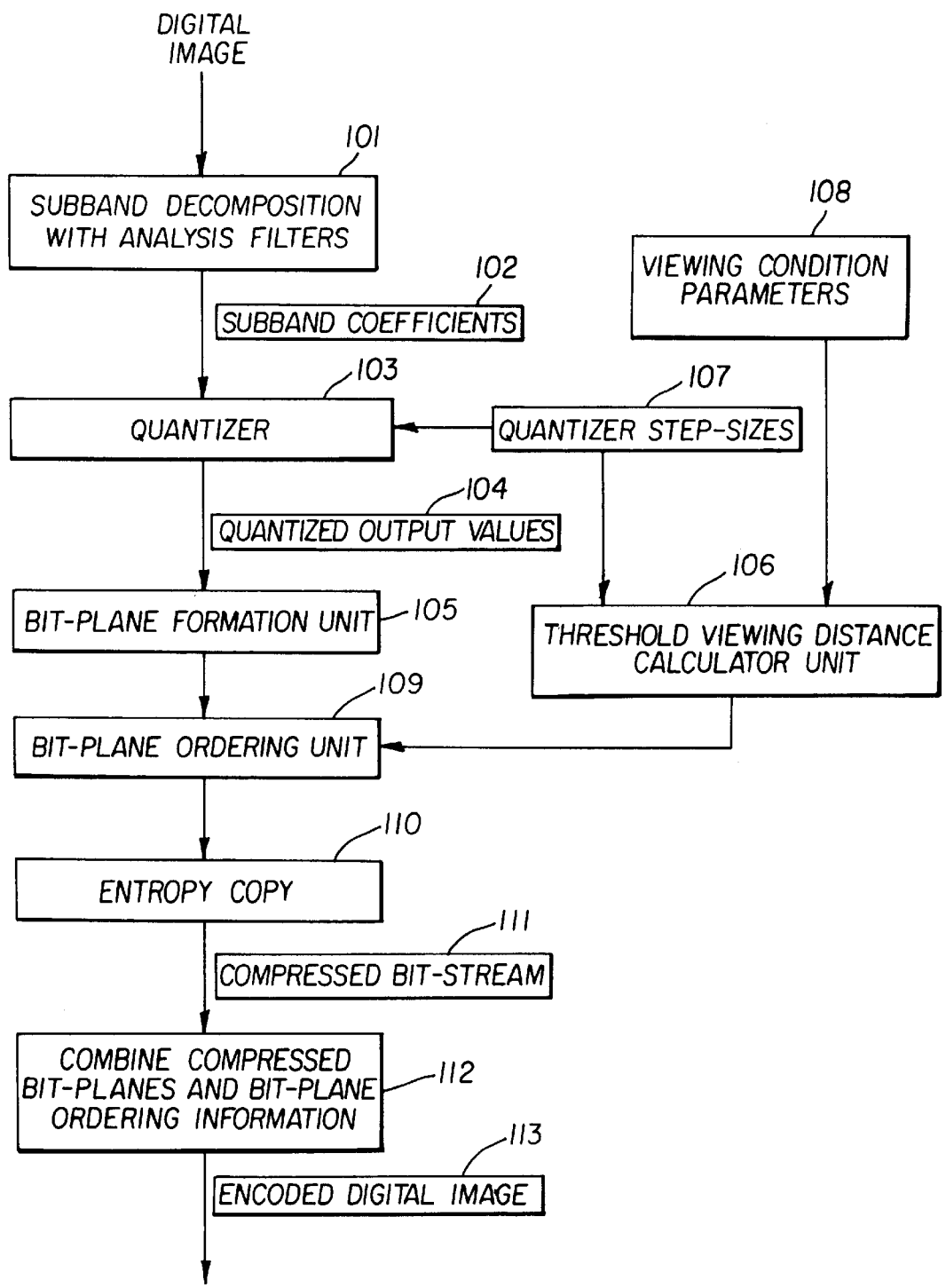
FIG. 1 shows a flow chart of the visually progressive ordering method.

A flow chart of an image coder based on bit-plane encoding of quantized subband or wavelet coefficients is shown in FIG. 1. A digital image undergoes subband decomposition (101) by the analysis filters to produce an image representation in terms of subband coefficients (102). The subband coefficients (102) are processed by a quantizer (103) to produce quantized output values for subband coefficients (104). It is possible to use any quantizer having the successive approximation property. Furthermore, if the subband filters satisfy certain properties (R. Calderbank, I. Daubechies, W. Sweldens, and B.-L. Yeo, "Wavelet Transform that Maps Integers to Integers," *Applied and Computational Harmonic Analysis*, vol. 5, no. 3, pp. 332–369, 1998), the quantization step (103) may be entirely absent. But in the preferred embodiment, a uniform scalar quantizer with a dead-zone is used. The bit-plane formation unit (105) produces a bit-plane representation of the output values of quantized subband coefficients. Then, a threshold viewing distance calculator unit (106) calculates the threshold viewing distance for each bit-plane from the quantizer step-sizes (107) and viewing condition parameters (108). The bit-plane ordering unit (109) orders the bit-planes in the decreasing order of their threshold viewing distances. The entropy coder (110) encodes the ordered bit-planes to produce a compressed bit-stream (111). The combination unit (112) combines the compressed bit-stream with bit-plane ordering information to produce an encoded representation of the digital image (113). The compressed bit-planes appear in the output bit-stream in the decreasing order of visual significance or threshold viewing distance.

Figure 2:
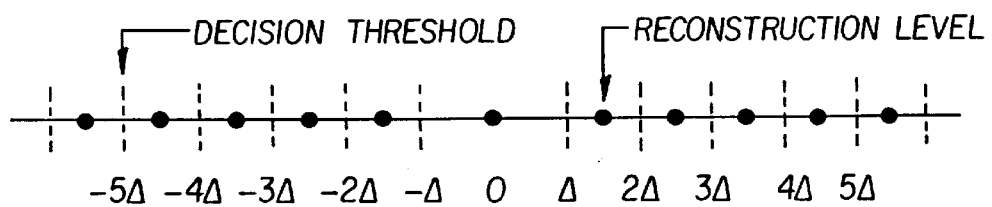
FIG. 2 shows a graph of a uniform scalar quantizer with dead-zone.

The blocks in FIG. 1 will now be described in greater detail. Let the total number of subbands in the decomposition be L, indexed as i=0,1, ..., (L−1). Let the samples of subband i be quantized with a scalar quantizer with step size $\Delta_i$. We use a uniform scalar quantizer with a dead-zone. The decision thresholds and reconstruction levels for this quantizer are shown in FIG. 2. It should be noted that the maximum quantization error is ($\Delta_i/2$), except for the zero bin which has a maximum quantization error of $\Delta_i$. Suppose that the magnitude of the quantized coefficients in subband i is represented by a fixed precision of $A_i$ bits. Let the bits be indexed as 0,1, ...,($A_i$−1), where index 0 corresponds to the least significant bit (LSB) and ($A_i$−1) corresponds to the most significant bit (MSB). Generally, the precision required to represent the magnitudes of quantized coefficients is different for the different subbands. One interesting property of this scalar quantizer is that discarding, or zeroing out, the k least significant bits from the fixed precision representation of a quantized coefficient from subband i is equivalent to scalar quantization with a step-size of $2^k \Delta_i$. Thus, if the compressed bit-stream corresponding to subband i is truncated so that the data corresponding to the last k bit-planes is discarded, it is possible to reconstruct a more coarsely quantized version of the subband. This is known as the embedding property. The compressed data representing an entire bit-plane of a subband is treated as a coding unit. It is possible to discard partial coding units to satisfy constraints on file size, but in a preferred embodiment, only entire coding units are discarded.

Now we will describe the process of determining the visual significance of a bit-plane in terms of a threshold viewing distance corresponding to the bit-plane. This is accomplished by using the two-dimensional Contrast Sensitivity Function (CSF) of the human visual system (HVS). The CSF model described in Jones et al., "Comparative study of wavelet and DCT decomposition with equivalent quantization and encoding strategies for medical images", *Proc. SPIE Medical Imaging '95*, vol. 2431, pp. 571–582, which is incorporated herein by reference, models the sensitivity of the human visual system as a function of the two-dimensional (2-D) spatial frequency, and it depends on a number of parameters, such as viewing distance, light level, color, image size, eccentricity, noise level, etc. The frequency dependence of the CSF is commonly represented using cycles/degree of visual subtense. The CSF can be mapped to other units, such as cycles/mm, for a given viewing distance (i.e., the distance from the observer to the displayed image).

The 2-D CSF value for subband i is $CSF(F_i, V)$, where V is the viewing distance and $F_i$ represents the 2-D spatial frequency (in cycles/mm) associated with subband i. In a preferred embodiment, we choose $F_i$ to be the center of the frequency range nominally associated with subband i. As described in the Jones et al. paper, if subband i is quantized with a uniform scalar quantizer having a dead-zone, the step-size $Q_i(V)$ that results in just noticeable distortion in the reconstructed image is $$Q_i(v) = \frac{1}{0.5 \times C \times MTF(F_i) \times G_i \times CSF(F_i, V)},$$

where $MTF(F_i)$ is the display MTF at frequency $F_i$, C is the contrast per code-value of the display device, and $G_i$ is the gain factor that represents the change in contrast for the reconstructed image for one code-value change in a coefficient of subband i. The gain factor depends on the level and orientation of the subband, as well as the subband synthesis filters. The factor 0.5 is present due to the fact that for uniform scalar quantizer, the maximum possible distortion is equal to half the step-size. As mentioned before, for a uniform scalar quantizer with a dead-zone, the maximum possible distortion for the zero bin is equal to the step-size. This may be taken into account by eliminating the factor 0.5 from the denominator.

The threshold viewing distance for a quantized image is defined as the viewing distance at which any distortion in the reconstructed image is just noticeable. Thus, the visual quality of a quantized image can be quantified in terms of the threshold viewing distance, e.g., a higher threshold viewing distance corresponds to lower visual quality. There are other quality metrics that can be used to assess visual significance, such as visually weighted mean squared error, but threshold viewing distance is particularly useful as it can easily be related to the CSF. Now, one model for the HVS is that it processes each band of a subband decomposition independently. Thus, the contribution of quantized subband i to the overall distortion in the reconstructed image is independent of the quantization occurring in any other subband. For a specific subband i that has been quantized with a step-size $Q_i$, we can also associate a corresponding threshold viewing distance $V_i$. We can write this relationship as $$Q_i = K(V_i),$$

where K is a function characterizing the dependence of $Q_i$ on the viewing distance $V_i$. We need the inverse of K to determine the threshold viewing distance for a particular step-size, i.e, $$V_i = K^{-1}(Q_i).$$

Figure 3:
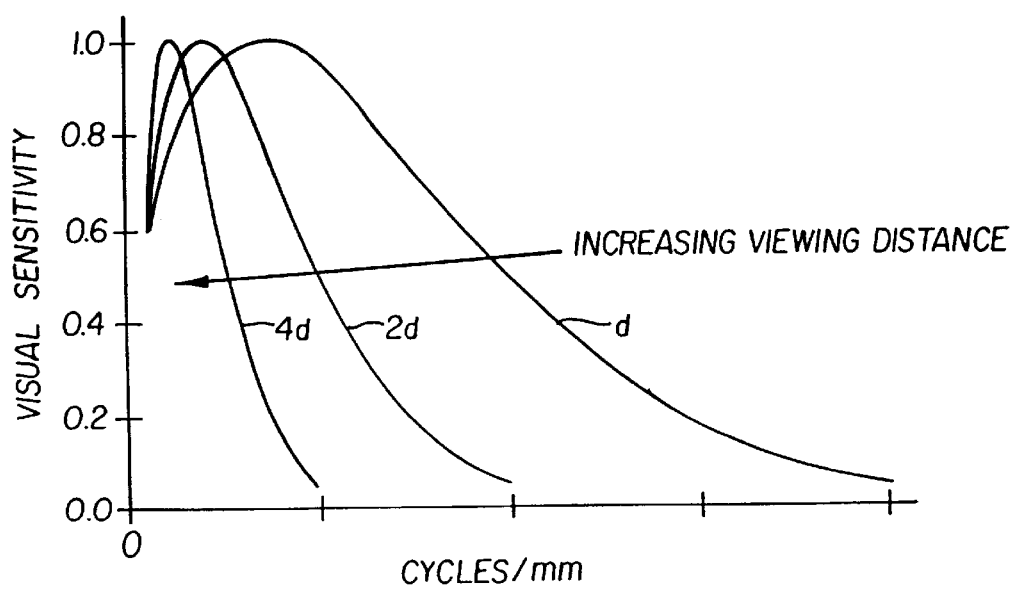
FIG. 3 shows a typical one-dimensional CSF for viewing distances of $d$, $2d$, and $4d$.

To find this inverse, we first note that the one-dimensional CSF at a given spatial frequency generally increases with decreasing viewing distance as shown in FIG. 3 for viewing distances of $d$, $2d$, and $4d$. However, at very low frequencies, it starts decreasing again, and thus a unique inverse, $K^{-1}$, does not exist. We can modify the CSF slightly to ensure the existence of $K^{-1}$. For calculating the CSF for a viewing distance V, we take an envelope of all CSF curves with a viewing distance greater than or equal to V. This ensures that K is a non-decreasing function. We define $K^{-1}$ in such a manner that ties are resolved in favor of the smallest viewing distance. This implies that the threshold viewing distance for a subband is strictly increasing function of the quantizer step-size. In the preferred embodiment, $K^{-1}$ is implemented as a look-up table.

When each subband is quantized, the overall threshold viewing distance for the reconstructed image, V, is determined by the worst-case scenario, that is, the quantized subband with the largest corresponding threshold viewing distance, i.e., $$V = \max_i V_i$$

Now consider the case of bit-plane encoding of the subbands, where subband i is initially quantized with a step-size of $\Delta_i$, $0 \leq i \leq (L-1)$. Suppose that the k least significant bit-planes are discarded from subband i. Then, the effective quantizer step-size for subband i is $(2^k \Delta_i)$, and the corresponding threshold viewing distance is $K^{-1}(2^k_i)$. If we send an additional bit-plane, we have an effective quantizer step $(2^{(k-1)} \Delta_i)$, and hence, the corresponding threshold viewing distance is $K^{-1}(2^{(k-1)} \Delta_i)$. Since $K^{-1}$ is a strictly increasing function, we have $$K^{-1}(2^k \Delta_i) \geq K^{-1}(2^{(k-1)} \Delta_i)$$

This means that sending an additional bit-plane for subband i results in a non-increasing threshold viewing distance for the quantized subband, as well as the reconstructed image. In other words, the bit-stream corresponding to a higher threshold viewing distance is embedded in the bit-stream corresponding to a lower threshold viewing distance.

We also associate a viewing distance $V_{i,k}$ with bit-plane k of subband i as follows. When bit-planes k, k−1 ..., 0 are discarded, the threshold viewing distance for subband i is defined to be $V_{i,k}$. Recall that this is equivalent to quantizing subband i with a step-size of $2^{(k+1)} \Delta_i$. Thus, $$V_{i,k} = K^{-1}(2^{(k+1)} \Delta_i)$$

The visually progressive ordering method calculates the threshold viewing distance corresponding to each bit-plane in each subband. Then, the bit-planes are arranged in the decreasing order of their corresponding viewing distances. Ties are broken in favor of a bit-plane from a lower indexed subband. After ordering the bit-planes in the visually progressive manner, each bit-plane is entropy coded. It is possible to use any entropy coding technique, but in the preferred embodiment context-based arithmetic coding is used.

The visual progressive bit-plane ordering method can be easily extended to provide a simple rate-control method when encoding one or more images. Suppose that N images ($N \geq 1$) have been compressed using the subband coder in the visually progressive manner previously described. We assume that the image size, display conditions, and ambient light are the same for each image. Let the total bit-budget be $R_T$ bytes. We describe a method to find a truncation point for the compressed bit-stream of each image, so as to maximize the overall visual quality of the image set.

As discussed previously, one may quantify the overall quality of a set of compressed images by the threshold viewing distance, $V_{set}$, for the set of N images. This is defined as the lowest viewing distance at which all reconstructed images in the set appear visually lossless, i.e., the distortion is just noticeable. If $V_p$ is the threshold viewing distance for image p, $1 \leq p \leq N$, at a given bit-stream truncation point, then $$V_{set} = \max_p V_p.$$

The problem of rate-control is to truncate each compressed bit-stream such that $V_{set}$ is minimized, subject to the constraint that the overall file size of the truncated bit-streams is at most $R_T$ bytes.

To perform the rate-control method, for each image, the subband encoder records some additional data in a separate table. The table $T_p$, corresponding to image p, has two columns. The first column is a list of compressed file sizes at possible truncation points, and the second column is a list of corresponding threshold viewing distances. The table for each image is prepared as follows. Let the compressed bit-planes be arranged in the visually progressive order as discussed previously. The first row of the table is filled with the file size of the entire bit-stream and the corresponding threshold viewing distance of the image reconstructed from the entire compressed bit-stream. The next row consists of the file size and threshold viewing distance when the compressed bit-stream is truncated to remove the data corresponding to the bit-plane appearing at the end of the compressed bit-stream. This process is repeated for the next possible truncation point until there is no compressed data left. Thus in the last row of the table, the compressed file size is set to 0 bytes and the corresponding threshold viewing distance is set to a number much larger than the expected viewing distance. For example, if the expected viewing distance is 12 inches, the threshold viewing distance in the last row may be set to 1200 inches. If multiple rows have the same threshold viewing distance, the row that has the smallest file size for that threshold viewing distance is retained.

Figure 4:
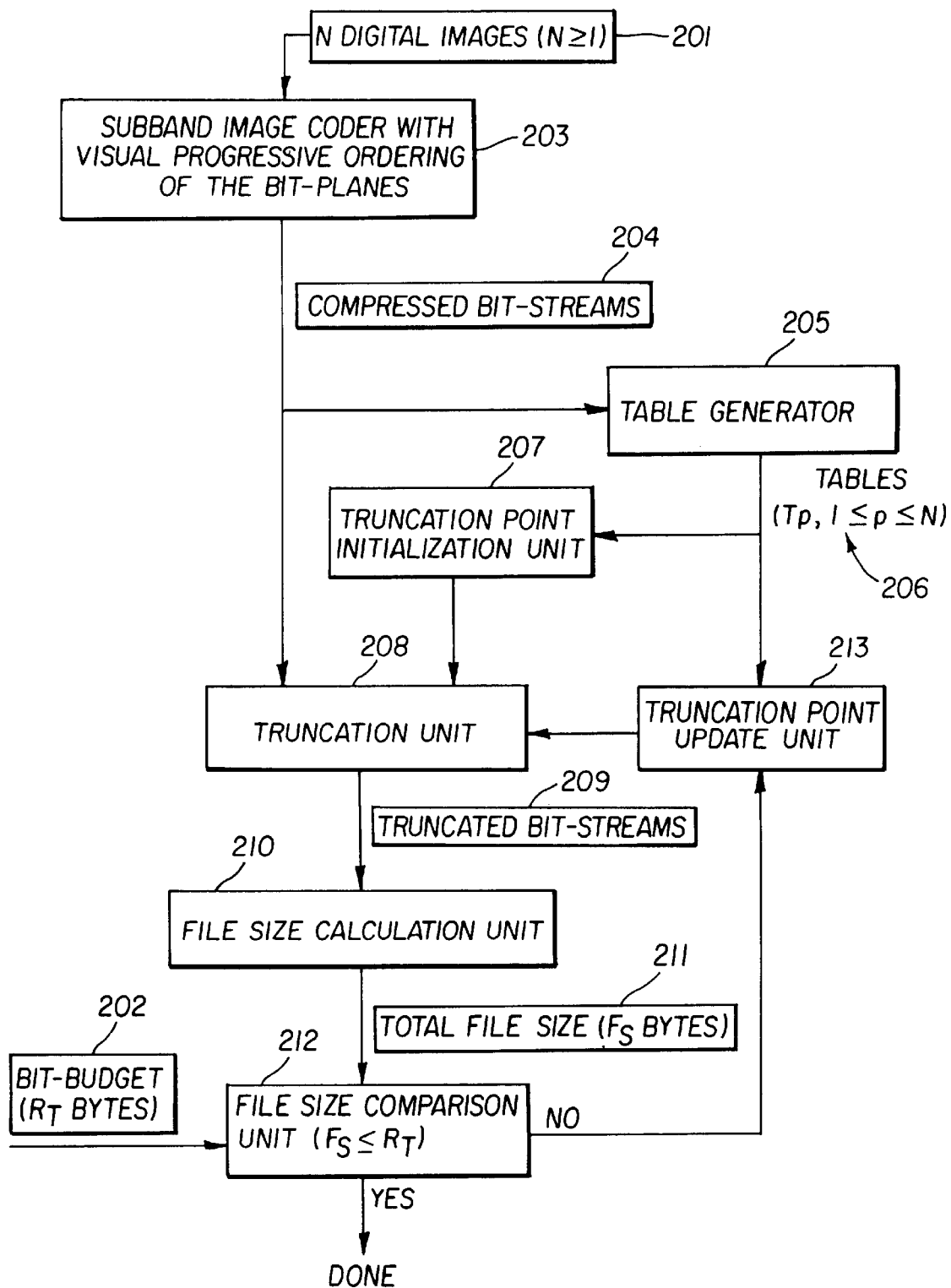
FIG. 4 shows a flow chart of the rate-control method.

The flow chart of the rate-control method is shown in FIG. 4. Given a set of N images, $N \geq 1$, (201) and a bit-budget of $R_T$ bytes (202), the method proceeds as follows. The subband bit-plane coder (203) encodes each image in the set in the visually progressive manner, as described previously, generating compressed bit-streams (204). For each image, the table generating unit (205) records the compressed file sizes and the corresponding threshold viewing distances for possible truncation points. We denote the table corresponding to image p by $T_p$, $1 \leq p \leq N$ (206). The truncation point initialization unit (207) initializes truncation point for each image so that the entire image is retained. Those skilled in the art will recognize that it is also possible to initialize the truncation points in other ways. For example, the user may specify a desired maximum visual quality level in terms of a threshold viewing distance for each image. In this case, the truncation point for each image may be chosen to correspond to the maximum threshold viewing distance that is less than or equal to the user-specified threshold viewing distance for that image. The truncation unit (208) truncates the compressed bit-stream for each image to the corresponding current truncation point to produce truncated bit-streams (209). The file size calculation unit (210) calculates the total compressed file size $F_s$ (211) for the truncated compressed bit-streams. The file size comparison unit (212) compares the total compressed file size with the bit-budget of $R_T$ bytes. If the total compressed file size is less than or equal to $R_T$ bytes, the process is stopped. Otherwise, the truncation point update unit (213) sets the current truncation point to the next row, for the image having the lowest threshold viewing distance at the next possible truncation point. Ties are broken in favor of the image that results in the smallest overall file size after updating its truncation point. The process of truncation, total file size calculation, file size comparison and update continues until the bit-budget is met.

In another embodiment of the invention, the user specifies desired minimum and maximum visual quality levels. In this case, we associate a minimum viewing distance, $V_{min}$, to the maximum visual quality level. Similarly, we associate a maximum viewing distance, $V_{max}$, to the minimum visual quality level. Then for subband i, the quantizer step-size required to achieve a threshold viewing distance of $V_{min}$ is calculated as $$\Delta_i = Q_i(V_{min})$$

Each image in the set is encoded in the visually progressive manner by using quantizer step-sizes as described above. At the same time the table generation is modified as follows. For each image, the rows with threshold distance of more than $V_{max}$ are deleted. Hence for each image, the first row of the table has a threshold distance of $V_{min}$ and the last row has a threshold viewing distance of less than or equal to $V_{max}$. Those skilled in the art will recognize that it is also possible to start with compressed bit-streams corresponding to the minimum file size, and then choose successive concatenation points to add more bit-planes until the overall file size exceeds the bit-budget of $R_T$ bytes. Our method starts with compressed bit-streams corresponding to the maximum file size, and then truncates bit-planes. This has certain advantages in terms of computational complexity if the rate-control has to be performed multiple times for successively lower bit-budgets. Further modification and variation can be made to the disclosed embodiments without departing from the subject and spirit of the invention as defined in the following claims. Such modifications and variations, as included within the scope of these claims, are meant to be considered part of the invention as described.

PARTS LIST

Digital Image

| | |
|---|---|
| 101 | Subband Decomposition with Analysis Filters |
| 102 | Subband Coefficients |
| 103 | Quantizer |
| 104 | Quantized Output Values |
| 105 | Bit-plane Formation Unit |
| 106 | Threshold Viewing Distance Calculator Unit |
| 107 | Quantizer Step-sizes |
| 108 | Viewing Condition Parameters |
| 109 | Bit-plane Ordering Unit |
| 110 | Entropy Coder |
| 111 | Compressed Bit-stream |
| 112 | Combine Compressed Bit-planes and Bit-plane Ordering information |
| 113 | Encoded Digital Image |
| 201 | N Digital Images (N ≥ 1) |

-continued

| | |
|---|---|
| 202 | Bit-budget ($R_T$ bytes) |
| 203 | Subband Image Coder with Visual Progressive Ordering of the Bit-planes |
| 204 | Compressed Bit-streams |
| 205 | Table Generator |
| 206 | Tables ($T_p$, $1 \leq p \leq N$) |
| 207 | Truncation Point Initialization Unit |
| 208 | Truncation Unit |
| 209 | Truncated Bit-streams |
| 210 | File Size Calculation Unit |
| 211 | Total File Size ($F_s$ bytes) |
| 212 | File Size Comparison Unit ($F_s \leq R_T$) |
| 213 | Truncation Point Update Unit |

What is claimed:

1. A method for encoding a digital image in a visually progressive manner comprising the steps of:
    a) inputting the digital image;
    b) decomposing the digital image into two or more subbands;
    c) quantizing the subbands of the decomposed digital image to create quantized output values for each subband, wherein each subband is quantized with a specific quantizer step size;
    d) forming bit-planes from the quantized output values of each subband and calculating an effective quantizer step size for each bit-plane;
    e) computing a visual significance value for each bit-plane from the effective quantizer step size associated with that bit plane;
    f) ordering the bit-planes in decreasing order of the corresponding visual significance value;
    g) entropy coding the ordered bit-planes to produce a compressed bit-stream; and
    h) combining the compressed bit-stream with bit-plane ordering information to produce an encoded representation of the digital image.

2. The method as claimed in claim 1, wherein the visual significance value is a threshold viewing distance.

3. The method according to claim 1, wherein the decomposing of step b) is performed using wavelet analysis filters.

4. The method according to claim 1, wherein the quantizing of step c) is performed using a uniform scalar quantizer with a dead-zone.

5. The method according to claim 2, wherein the threshold viewing distance of step e) is computed using a model of the contrast sensitivity function for the human visual system.

6. The method according to claim 1, wherein entropy coding of step g) is performed using a context-based arithmetic coder.

7. A method of rate-control for one or more images comprising the steps of:
    a) encoding the images in a visually progressive manner to form a compressed bit-stream for each image;
    b) generating a table of visual significance values and corresponding file sizes for possible truncation points of the compressed bit-stream for each image;
    c) initializing a current truncation point for each image;
    d) truncating the compressed bit-stream for each image to the corresponding current truncation point;
    e) calculating a total compressed file size for the truncated compressed bit-streams;
    f) comparing the total compressed file size with a pre-determined bit-budget;
    g) updating the current truncation point to the next possible truncation point for the image having the lowest visual significance value at the next possible truncation point; and
    h) repeating steps d through g until the total compressed file size is equal to or less than the bit-budget.

8. The method as claimed in claim 7 wherein the visual significance value is a threshold viewing distance.

9. The method according to claim 8, wherein the threshold viewing distance of step b) is computed using a model of the contrast sensitivity function for the human visual system.

10. The method according to claim 7, wherein the encoding of step a) is performed only up to a pre-determined maximum visual quality level.

11. The method according to claim 10, wherein the maximum visual quality level is specified in terms of a threshold viewing distance.

12. The method according to claim 7, wherein the maximum visual quality level is specified for each image.

13. The method according to claim 7, wherein the table generating of step b) is performed according to a predetermined maximum and minimum visual quality levels.

14. The method according to claim 13, wherein the maximum and minimum visual quality levels are specified in terms of threshold viewing distances.

15. The method according to claim 13, wherein the maximum and minimum visual quality levels are specified for each image.

16. A computer program product for encoding a digital image in a visually progressive manner comprising: a computer readable storage medium having a computer program stored thereon for performing the steps of:
    i) inputting the digital image;
    j) decomposing the digital image into two or more subbands;
    k) quantizing the subbands of the decomposed digital image to create quantized output values for each subband, wherein each subband is quantized with a specific quantizer step size;
    l) forming bit-planes from the quantized output values of each subband and calculating an effective quantizer step size for each bit-plane;
    m) computing a visual significance value for each bit-plane from the effective quantizer step size associated with that bit plane;
    n) ordering the bit-planes in decreasing order of the corresponding visual significance value;
    o) entropy coding the ordered bit-planes to produce a compressed bit-stream; and
    p) combining the compressed bit-stream with bit-plane ordering information to produce an encoded representation of the digital image.

17. The computer program product as claimed in claim 16 wherein the visual significance value is a threshold viewing distance.

18. The computer program product as claimed in claim 16, wherein the decomposing of step b) is performed using wavelet analysis filters.

19. The computer program product as claimed in claim 16, wherein the quantizing of step c) is performed using a uniform scalar quantizer with a dead-zone.

20. The computer program product as claimed in claim 17, wherein the threshold viewing distance of step e) is computed using a model of the contrast sensitivity function for the human visual system.

21. The computer program product as claimed in claim 16, wherein entropy coding of step g) is performed using a context-based arithmetic coder.

22. A computer program product for rate-control for one or more images comprising: a computer readable storage medium having a computer program stored thereon for performing the steps of:
- a) encoding the images in a visually progressive manner to form a compressed bit-stream for each image;
- b) generating a table of visual significance values and corresponding file sizes for possible truncation points of the compressed bit-stream for each image;
- c) initializing a current truncation point for each image;
- d) truncating the compressed bit-stream for each image to the corresponding current truncation point;
- e) calculating a total compressed file size for the truncated compressed bit-streams;
- f) comparing the total compressed file size with a predetermined bit-budget;
- g) updating the current truncation point to the next possible truncation point for the image having the lowest visual significance value at the next possible truncation point; and
- h) repeating steps d through g until the total compressed file size is equal to or less than the bit-budget.

23. The computer program product as claimed in claim 22 wherein the visual significance value is a threshold viewing distance.

24. The computer program product as claimed in claim 23, wherein the threshold viewing distance of step b) is computed using a model of the contrast sensitivity function for the human visual system.

25. The computer program product as claimed in claim 22, wherein the encoding of step a) is performed only up to a predetermined maximum visual quality level.

26. The computer program product as claimed in claim 25, wherein the maximum visual quality level is specified in terms of a threshold viewing distance.

27. The computer program product as claimed in claim 22, wherein the maximum visual quality level is specified for each image.

28. The computer program product as claimed in claim 22, wherein the table generating of step b) is performed according to a predetermined maximum and minimum visual quality levels.

29. The computer program product as claimed in claim 28, wherein the maximum and minimum visual quality levels are specified in terms of threshold viewing distances.

30. The computer program product as claimed in claim 28, wherein the maximum and minimum visual quality levels are specified for each image.

* * * * *